(No Model.)

H. W. LIBBEY.
MEAT BROILER.

No. 243,714. Patented July 5, 1881.

Witnesses.  Inventor.

UNITED STATES PATENT OFFICE.

HOSEA W. LIBBEY, OF CLEVELAND, OHIO.

MEAT-BROILER.

SPECIFICATION forming part of Letters Patent No. 243,714, dated July 5, 1881.

Application filed March 25, 1881. (No model.)

*To all whom it may concern:*

Be it known that I, HOSEA W. LIBBEY, of Cleveland, in the county of Cuyahoga and State of Ohio, have invented a certain Improved Broiler for Culinary Use; and I do hereby declare the following to be a description thereof.

The object of this improved broiler is to broil meat over coals of fire without allowing the meat to come in direct contact with the fire or the smoke and flames thereof, and thereby avoid smoking and burning of the meat and at the same time obtain the flavor peculiar to meat cooked upon an ordinary gridiron with wood-coals, and without losing the juices thereof, which, when the meat is broiled upon an open gridiron, are lost by falling through the space between the bars into the fire.

In broiling meat over a fire of bituminous coal in the ordinary way it becomes impregnated with the smoke and gas from the coal, which very much impairs the flavor of the meat and gives it a smoky or sooty taste.

The broiler hereinabove referred to is further described in the following specification, reference being had to the annexed drawings, making part of the same, in which—

Figure 1:
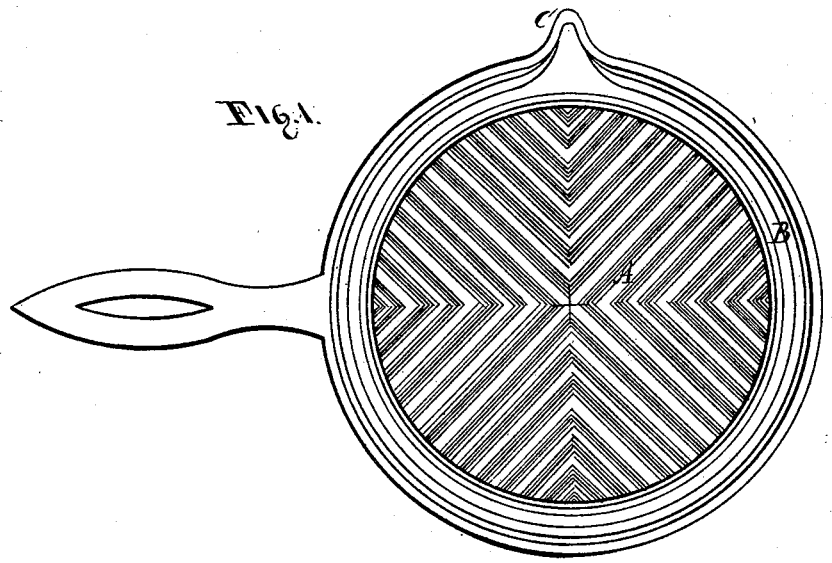
Figure 2:

Figure 1 represents a view of the upper side of the broiler. Fig. 2 is a transverse section.

Like letters refer to like parts in the drawings.

This broiler is made of cast metal, circular in form, and of any size adapted to fit the holes in an ordinary cook-stove. The central part, A, of the broiler is concavo-convex, the convex side being upward. The entire surface of the center is surrounded by a channel, B, forming a rim to the central part, and upon which the utensil rests. Said channel is provided with a lip, C, for pouring out the contents. The central part of the utensil is not only concavo-convex, but it is also corrugated, and the corrugations so arranged as to have a downward direction to the channel, and terminating at the inner edge thereof, as shown in the drawings.

It will be noticed that the corrugations are arranged at right angles to each other. This particular arrangement, however, is not essential so long as they tend downward to the channel. The corrugations cover the entire central surface of the broiler without any openings, it being a wholly-closed surface. The meat is thereby shut off from the contact of smoke and soot arising from the coals when laid upon the broiler, the cooking being done by the heat passing through the solid metal center, and is therefore not burned or injured by gas and smoke from the fire; nor is there any waste of the juices of the meat, as they are saved by running into the channel B, from which they can be poured out through the lip C.

By means of the corrugations the meat is prevented from a general contact with the entire metal surface, thereby allowing heated air to pass along the lower or depressed corrugations between the meat and the metal; hence there is no frying of the meat, as is the case when laid flat upon the smooth even surface of a frying-pan. To the latter mode of cooking meat there are well-known objections.

The meat cooked on this improved utensil is broiled as upon an ordinary open gridiron, having the same flavor without being smoked, and without having the sooty taste resulting from a bituminous-coal fire, which is so generally now used. It is well known that meat broiled over a fire of wood-coal gives it a peculiar and desirable flavor. This result is attained by my improved utensil, which also, by the corrugations, gives the meat the streaked appearance caused by the ordinary gridiron, and without losing its juices.

I am aware that corrugated gridirons with openings have been and are in use; but such utensils are objectionable, as before mentioned, because of the openings or spaces between the bars and corrugations, which my improvement avoids.

What I claim as my improvement, and desire to secure by Letters Patent, is—

The broiler having a concavo-convex central portion or center provided with closed corrugations extending from the crown in downward directions with an angular relation to each other, and surrounded at the base by a circular channel, B, connected with a spout, substantially as set forth.

In testimony whereof I affix my signature in presence of two witnesses.

HOSEA W. LIBBEY.

Witnesses:
J. H. BURRIDGE,
M. L. DEERING.